United States Patent
Baudesson

(10) Patent No.: US 8,040,648 B2
(45) Date of Patent: *Oct. 18, 2011

(54) SPEED CONTROLLER INCLUDING A DEVICE FOR PROTECTION AGAINST OVERCURRENTS AND OVERVOLTAGES

(75) Inventor: Philippe Baudesson, La Boissiere (FR)

(73) Assignee: Schneider Toshiba Inverter Europe SAS, Pacy-sur-Eure (FR)

( * ) Notice: Subject to any disclaimer, the term of this patent is extended or adjusted under 35 U.S.C. 154(b) by 254 days.

This patent is subject to a terminal disclaimer.

(21) Appl. No.: 12/388,131

(22) Filed: Feb. 18, 2009

(65) Prior Publication Data
US 2009/0213513 A1 Aug. 27, 2009

(30) Foreign Application Priority Data
Feb. 21, 2008 (FR) ...................... 08 51103

(51) Int. Cl.
*H02H 3/20* (2006.01)
(52) U.S. Cl. .............. 361/91.5; 318/400.3; 323/311; 361/91.1; 361/93.1
(58) Field of Classification Search .......... None
See application file for complete search history.

(56) References Cited

U.S. PATENT DOCUMENTS

| | | | |
|---|---|---|---|
| 4,482,854 A * | 11/1984 | Kawada et al. | 318/801 |
| 5,127,085 A * | 6/1992 | Becker et al. | 318/434 |
| 6,049,185 A * | 4/2000 | Ikeda | 318/442 |
| 6,353,545 B1 * | 3/2002 | Ueda | 363/40 |
| 7,551,462 B2 * | 6/2009 | Uruno et al. | 363/89 |
| 7,602,228 B2 * | 10/2009 | Mazzola et al. | 327/423 |
| 2007/0147099 A1 | 6/2007 | Tai et al. | |

FOREIGN PATENT DOCUMENTS

| | | |
|---|---|---|
| EP | 1 862 348 A1 | 12/2007 |
| FR | 2 538 187 | 6/1984 |

OTHER PUBLICATIONS

U.S. Appl. No. 12/388,099, filed Feb. 18, 2009, Baudesson, et al.

* cited by examiner

*Primary Examiner* — Jared Fureman
*Assistant Examiner* — Terrence R Willoughby
(74) *Attorney, Agent, or Firm* — Oblon, Spivak, McClelland, Maier & Neustadt, L.L.P.

(57) ABSTRACT

The invention relates to a speed controller comprising:
  at the input, a rectifier module (12) in order to generate, on a power bus (10, 11), a direct voltage from an alternating voltage available on an electrical supply network (A),
  a bus capacitor (Cb) connected between a positive line and a negative line of the power bus,
  an inverter module (13) supplied by the power bus and controlled to deliver an alternating voltage to an electric load (2),
  a device (14) for protecting the controller consisting of a first electronic switch of the JFET transistor type (T1) and a second electronic switch (T2) mounted on the power bus, in parallel with the JFET transistor (T1).

18 Claims, 1 Drawing Sheet

Figure 1:
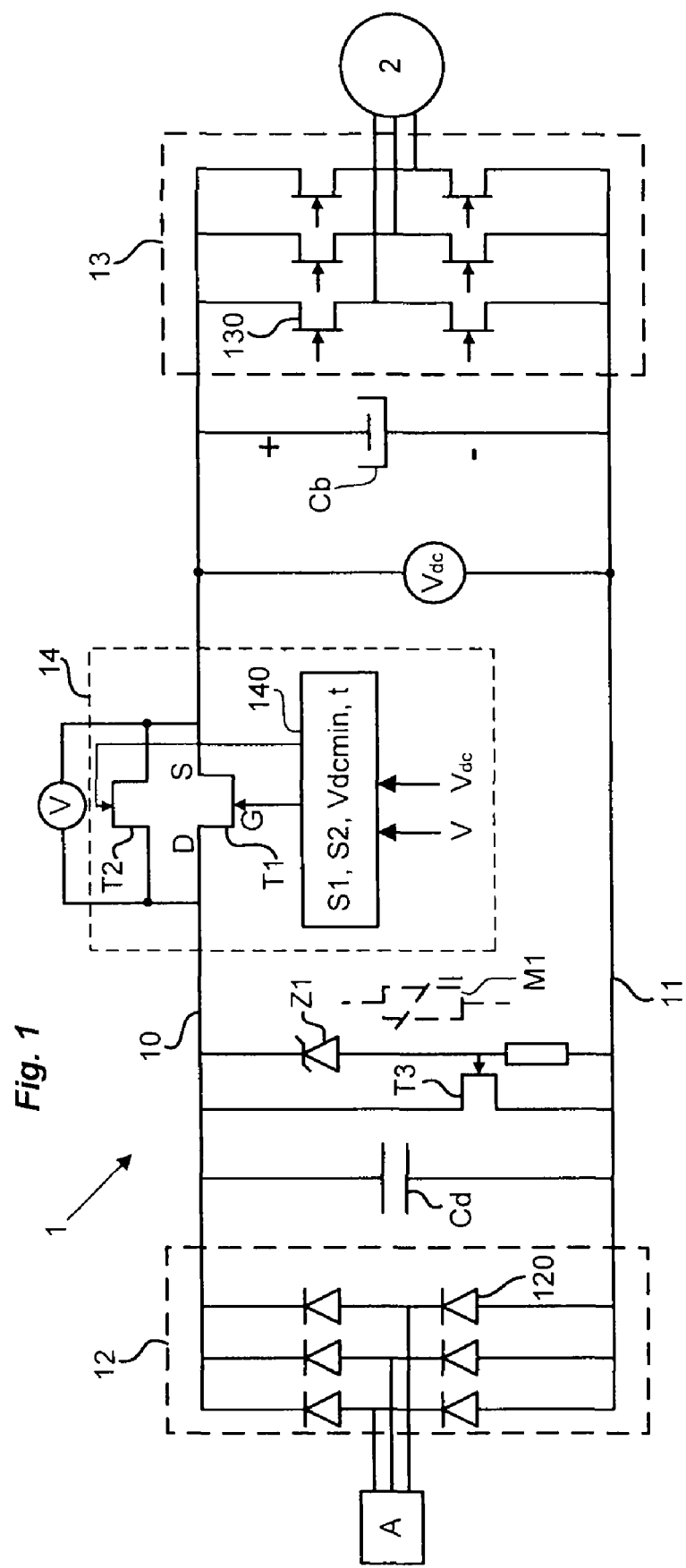

SPEED CONTROLLER INCLUDING A DEVICE FOR PROTECTION AGAINST OVERCURRENTS AND OVERVOLTAGES

The present invention relates to a speed controller furnished with a device for protection against overcurrents and overvoltages generated by overvoltages or undervoltages on the electrical supply network.

In a known manner, a speed controller is connected to the electrical supply network and designed to control an electric load. It comprises, at the input, a voltage rectifier module which transforms an alternating voltage supplied by the electrical network into a direct voltage and which supplies downstream a power bus furnished with a positive line and a negative line. A filter capacitor, commonly called a bus capacitor, is mounted between a positive terminal and a negative terminal of the power bus. At the output, the controller comprises an inverter module supplied by the power bus, making it possible to generate, from the direct voltage, an alternating voltage which may have variable amplitude and frequency by using electronic switches for example of the IGBT transistor type controlled by Pulse Width Modulation (PWM).

The electrical supply network may experience various types of disruptions such as overvoltages or undervoltages. The disruptions may be of high amplitude and of short duration, therefore weakly energizing, or of low amplitude and of long duration, therefore greatly energizing. If the disruptions are greatly energizing, certain components of the controller such as the diodes of the rectifier module, the bus capacitor or the transistors of the inverter module may be damaged either by strong inrush current on the side of the rectifier module or by overvoltage on the side of the inverter module if the bus capacitor has a low capacitance.

The object of the invention is therefore to propose a speed controller making it possible to absorb the disruptions of the electrical network without damage.

This object is achieved by a speed controller comprising:
   at the input, a rectifier module in order to generate, on a power bus, a direct voltage from an alternating voltage available on an electrical supply network,
   a bus capacitor connected between a positive line and a negative line of the power bus, and
   an inverter module supplied by the power bus and controlled to deliver an alternating voltage to an electric load, characterized in that:
   the controller comprises a device for protecting the controller against overcurrents associated with voltage variations on the electrical supply network,
   and in that this protective device comprises:
   a first electronic switch of the JFET transistor type made in a wide forbidden band material and placed on the power bus in series between the rectifier module and the bus capacitor,
   a second electronic switch mounted on the power bus, in parallel with the JFET transistor,
   means for controlling both the JFET transistor and the second electronic switch.

According to a particular feature, the protective device is mounted on the positive line of the power bus.

Preferably, the first electronic switch, the JFET transistor, is of the normally-closed type and is made of silicon carbide.

Preferably, the second electronic switch is a normally-closed transistor of the JFET type, made of silicon carbide.

According to another particular feature, the means for controlling the first electronic switch and the second electronic switch are connected between the positive line and the negative line of the power bus.

According to another particular feature, the control means comprise charge pump circuits capable of applying control voltages to the first and second electronic switches.

According to another particular feature, the control means comprise storage means storing a threshold value for the voltage measured at the terminals of the JFET transistor, above which the second electronic switch is commanded to open by the control means. The storage means also store a threshold value for the voltage measured between the positive line and the negative line of the power bus, above which the second electronic switch is commanded to open.

According to another particular feature, the controller also comprises a device for protecting the rectifier module against overvoltages. This device for protecting the rectifier module against overvoltages comprises for example a limiting transistor of the normally-closed JFET type and a Zener diode, both connected in parallel between the positive line and the negative line of the power bus. As a variant, this device for protecting the rectifier module against overvoltages may comprise a varistor of the GMOV type connected between the positive line and the negative line of the power bus.

Other features and advantages will appear in the following detailed description with reference to an embodiment given as an example and represented by the appended drawings in which FIG. 1 represents in a simplified manner a speed controller, furnished with the protective device of the invention.

With reference to FIG. 1, a speed controller 1 comprises a direct voltage source which supplies a power bus with a direct voltage Vdc (for example of the order of 200 to 800 Vcc or more, depending on the conditions of use). The power bus consists of a positive line 10 and a negative line 11. A bus capacitor Cb is usually used to keep the direct voltage Vdc of the power bus constant or to filter the chopped current of the direct bus managed by the inverter module (controller of the "C-less"type). This bus capacitor Cb is connected between a positive terminal and a negative terminal of the power bus and is usually of the electrolytic type for standard controllers or of the film type for controllers of the "C-less" type.

In FIG. 1, the controller 1 comprises, at the input, a rectifier module 12 which is designed to rectify a three-phase alternating voltage originating from an outside electrical supply network A (for example a 380 Vac three-phase electrical network). This rectifier module 12 advantageously uses diodes 120 which are more economical and more reliable than thyristors.

The speed controller 1 then comprises, at the output, an inverter module 13 making it possible, from the power bus, to control an electrical load 2 with an alternating voltage which may have variable amplitude and frequency. The inverter module 13 uses for this purpose a Pulse Width Modulation (PWM) control for controlling the electronic power switches 130 mounted on each phase. These switches are power transistors, for example of the IGBT type, controlled by a control module, not shown in FIG. 1. In FIG. 1, the inverter module 13 comprises three arms for delivering a three-phase alternating voltage to the electric load 2, each arm being furnished with two power transistors in series between a positive terminal and a negative terminal of the power bus, that is a total of six power transistors.

The invention consists in placing a protective device 14 in the controller in order to protect it against the overcurrents and overvoltages associated with variations of voltage on the electrical supply network A.

These overcurrents may be generated by two distinct phenomena:
   when there is an overvoltage, a strong inrush current occurs in the bus capacitor Cb which may cause damage to the diode bridge of the rectifier module 12 and a strong overvoltage on the power bus which may cause damage to the inverter module 13 and the bus capacitor Cb, when there is a return to normal, after an undervoltage, a strong inrush current is also produced in the bus capacitor Cb which may cause damage to the diode bridge of the rectifier module 12.

It is therefore necessary to limit the inrush current in the rectifier module 12 in order to protect it during an overvoltage or after an undervoltage occurring on the network A.

For this, the device 14 of the invention comprises notably a first electronic switch of the normally-open or normally-closed JFET transistor type.

A JFET transistor is a known electronic power switch which comprises a control Gate (G) the function of which is to allow or prevent the passage of a current between a Drain (D) and a Source (S). Such a transistor is called Normally ON if the voltage $V_{GS}$ between the Gate and the Source is close to zero. This means that the Drain-Source path is on state or conducting in the absence of control voltage $V_{GS}$. Conversely, a JFET transistor is called "normally OFF" if the Drain-Source path is not conducting in the absence of voltage $V_{GS}$ between Gate and Source.

In addition, an electronic switch of the normally on JFET transistor type provides better performance than other types of voltage-controlled electronic power switches, such as MOSFETs, IGBTs or even switches of the normally off JFET type. Specifically, such a switch notably has the advantages of switching faster, generating fewer losses in conduction in the on state (low resistance $R_{DSon}$ in the on state), having better temperature resistance and having a smaller size.

The JFET transistor T1 is made of a large forbidden band material (also called "wide bandgap material"), that is to say having a low resistance in the on state $R_{DSon}$ and capable of withstanding considerable voltages (greater than 1000 V), such as for example silicon carbide (SiC) or gallium nitride (GaN).

The protective device 14 of the invention therefore preferably comprises a JFET transistor T1, normally on, made of a wide forbidden band material such as silicon carbide or gallium nitride. The transistor T1 is mounted on the positive line 10 of the power bus in series between the rectifier module 12 and the bus capacitor Cb.

The device also comprises a second electronic switch connected on the positive line 10 of the power bus, in parallel with the transistor T1. This second electronic switch is a transistor T2, for example of the JFET, IGBT or MOSFET type. It may be normally off or normally on. Preferably, a transistor T2 of the normally on JFET type is used which, like the transistor T1, is made of a wide forbidden band material, that is to say having a low resistance in the on state $R_{DSon}$ and capable of withstanding high voltages (greater than 1000 V), such as for example silicon carbide (SiC) or gallium nitride (GaN).

The device of the invention comprises means 140 for controlling the transistor T1 and the transistor T2. These control means 140 notably comprise processing means in order to decide whether to switch the transistor T1 and the transistor T2, storage means, a power supply designed to control the transistor T1 and a power supply designed to control the transistor T2. The power supplies used are for example charge pump circuits which each comprise, for example, a capacitor that is charged from the power bus during the pre-charging of the circuit and a Zener diode mounted in parallel with the capacitor. It is also possible to use an isolated external power supply to control the transistors T1 and T2 but, in this case, the control means 140 are no longer supplied directly from the power bus and the circuit is therefore no longer standalone. In this case, it could be envisaged to use transistors T1 and T2 of the normally off type.

According to the invention, the transistor T1 has, for example, a surface of silicon carbide that is sufficient for, on the one hand, its limitation current when cold (typically at a temperature of less than 150° C.) to be greater than the normal current required by the electric load 2 and for, on the other hand, it to be able to dissipate sufficient energy without breaking during the transient phases of charging the bus capacitor Cb and of overvoltage and undervoltage on the electrical supply network A. Typically, a silicon carbide JFET is capable of holding 0.5 J per mm$^2$ without short-circuit breaking. The silicon carbide surface of the transistor T2 must be sufficient for its limitation current when cold to be greater than the normal current required by the electric load 2. Not having to dissipate energy, the surface of T2 may be smaller than that of the transistor T1. Therefore, the resistance in the on state $R_{DSon}$ of the transistor T1 is weaker than the resistance in the on state $R_{DSon}$ of the transistor T2.

The controller 1 also comprises a decoupling capacitor Cd connected between the positive line 10 and the negative line 11 of the power bus, downstream of the rectifier module 12 and upstream of the protective device 14. This decoupling capacitor Cd serves to clip, for a limited period, the overvoltages that are strong but weakly energizing that occur on the electrical supply network A.

Depending on whether the controller 1 is on pre-charge on startup, sustains a network overvoltage or an undervoltage, the protective device 14 of the controller 1 operates in the following manner:

—On Startup (That is to Say No Load Current):

The transistor T1 and the transistor T2 are initially in the on state. Their resistance in the on state (Rdson) is very low. The voltage V measured between the Drain and Source terminals of the transistors T1 and T2 in parallel is therefore also very weak. If the bus capacitor Cb has a low capacitance (of the order of 2 μF/kW), its charging is fast and requires little energy. In this case, the inrush current is weak and neither of the two transistors therefore switches to limitation. On the other hand, if the bus capacitor Cb has a high capacitance (several tens of μF/kW), a strong inrush current occurs through the bus capacitor Cb. The transistor T1 then enters a limitation phase when the current that passes through it becomes greater than its limitation current. If the charge current of the capacitor Cb is greater than the limitation current of the transistor T1, the current may then pass through the transistor T2. If the current that passes through the transistor T2 is greater than its limitation current, the transistor T2 switches in its turn to limitation. When the transistors T1 and T2 are both in limitation, the measured voltage V increases. When this voltage V becomes greater than a first threshold value S1, for example equal to 3 Volts, the transistor T2 is commanded to open. Therefore all the charge current passes through the transistor T1. During the transient phase associated with the charging of the bus capacitor Cb, the transistor T1 must also withstand the voltage difference between the output voltage of the rectifier module 12 and the voltage at the terminals of the bus capacitor Cb. Withstanding both a current and a voltage, the silicon carbide chip of the transistor T1 must therefore dissipate a large amount of energy causing its junction temperature to rise and a great modification of its transconductance which is inversely proportional to the temperature. The great reduction of transconductance of the transistor T1 reduces its limitation current by a corresponding amount for a given gate voltage (typically for a silicon carbide chip, there is a ratio of ten between the limitation current when cold and when hot). Consequently, following a high dissipation of the transistor T1, it is necessary to allow it to cool for it to return to a limitation current when cold.

When the charging of the bus capacitor Cb is complete, the voltage V at the terminals of the transistors T1 and T2 becomes zero and therefore drops back below the first threshold value S1. The transistor T2 is then commanded to close. Ideally, the transistor T2 must be commanded to open as soon as the transistor T1 enters limitation, so as not to be placed in limitation and therefore not to heat up in order not to change the value of its transconductance. The transistor T2 which has not heated up or heated up very little is then available for an immediate startup of the electric load 2 and of the controller 1 without waiting for the transistor T1 to cool. The transistor T2 therefore removes the thermal memory effect of the transistor T1.

Without the transistor T2, the current of the electric load 2 and of the controller 1 would have a high risk of being greater than the limitation current of the transistor T1. The transistor T1 would then have been kept in a state of limitation causing an integration of the energy to be dissipated and a rise in its junction temperature until its short-circuit breakage occurred. Once broken, the transistor T1 no longer has the capacity to limit the current and constantly to protect the controller 1.

—Network Overvoltage

In the case of an overvoltage on the electrical supply network A, the bus capacitor Cb creates a strong inrush current. In this situation, the direct voltage Vdc measured at the terminals of the bus capacitor Cb then reaches a maximum value Vdcmax. When the voltage Vdc is greater than a second threshold value S2, less than Vdcmax, the transistor T2 is commanded to open. The transistor T2 may also be commanded to open if the two transistors T1 and T2 have returned to limitation and if the voltage V measured between the Drain and Source terminals of the two transistors has exceeded the first threshold value S1. Once the transistor T2 is off, the transistor T1 is placed in the linear state by the control means 140 in order to limit the current on the power bus so as to regulate the direct voltage Vdc to the maximum voltage Vdcmax. The second threshold value S2 is chosen so that the transistor T2 turns off when there is an overvoltage and so that it remains off while the transistor T1 is regulating the voltage Vdc around Vdcmax. The second threshold value S2 is, for example, equal to Vdcmax-15 Volts. The transistor T1 then withstands all the overvoltage and itself dissipates all the energy generated by the increase in its resistance and the passage of the current intended for the load 2.

If the overvoltage stops and the bus capacitor Cb is fully charged, the voltage V at the terminals of the transistors T1 and T2 is cancelled out and therefore goes back below the first threshold value S1. The transistor T2 is then commanded to close. The transistor T1 may then cool down because the load current preferably passes through the transistor T2. The transistor T2 then removes the thermal memory effect of the transistor T1.

If the overvoltage persists and the limitation current becomes less than the charge current because of the progressive increase in the resistance of the transistor T1, the transistor T1 can no longer supply the current demanded by the load 2. This causes a reduction in the voltage Vdc.

If the voltage Vdc rises again and the voltage V at the terminals of the transistors T1 and T2 again drops below the first threshold value S1, the transistor T2 is commanded to close and will make it possible to relieve the transistor T1 by removing the thermal memory effect of the transistor T1.

On the other hand, if the voltage Vdc drops below a threshold value Vdcmin, the inverter module 13 is stopped so as no longer to supply current to the electric load 2. It is then necessary to recharge the bus capacitor Cb by proceeding in the same way as for the startup. When the bus capacitor Cb is fully charged, the transistor T2 is commanded to close. The inverter module 13 is, for example, restarted after a defined period, for example with the aid of a command of the restart on-the-fly type. The two transistors T1 and T2 are then in the on state and the charge current may pass through the transistor T2 until the transistor T1 has cooled.

Furthermore if the voltage V at the terminals of the transistors T1 and T2 stays at a value higher than the first threshold value S1 while the voltage Vdc stays above the threshold value Vdcmin, for longer than a defined period t, for example equal to three seconds, that means that the overvoltage has ended and that the charge current remains slightly below the limitation current of the transistor T1. Because of the thermal memory effect, the transistor T1 is kept in limitation. To protect itself, the transistor T1 is then commanded to open so that the voltage Vdc is cancelled out. After a defined period necessary for the transistor T1 to cool, the bus capacitor Cb is recharged by proceeding as for the startup. Then, the inverter module 13 is for example restarted after a defined period, for example with the aid of a command of the restart on-the-fly type.

—Network Undervoltage

During an undervoltage on the supply network of the controller, the transistor T1 is on and the bus capacitor Cb discharges if an electric load 2 is present on the inverter or does not discharge if there is no electric load 2 present on the inverter. After the end of the undervoltage, when a normal voltage returns, if the bus capacitor Cb has not been discharged, no inrush current occurs. On the other hand, if during the undervoltage the bus capacitor Cb is discharged to supply the electric load 2, the bus capacitor Cb must be recharged when a normal voltage returns, which causes a strong inrush to flow current through the bus capacitor Cb. In this situation, as for the startup, the transistors T1 and T2 go to limitation, which has the effect of increasing the voltage V measured at their terminals. When this voltage V exceeds the first threshold value S1, the transistor T2 is commanded to open. The transistor T1 then experiences all the return of undervoltage and will heat up.

If the limitation current is not lower than the charge current, the bus capacitor Cb can charge normally via the transistor T1. Then, when the bus capacitor Cb is fully charged, the voltage V at the terminals of the transistors T1 and T2 is cancelled out. The transistor T2 is commanded to close and can be used to pass the charge current. It thus makes it possible to remove the thermal memory effect from the transistor T1 which has heated up during the charging of the bus capacitor Cb.

On the other hand, if the limitation current becomes less than the charge current because of the increase in the resistance of the transistor T1, the voltage Vdc reduces because the bus capacitor Cb discharges. When the voltage Vdc becomes less than the threshold value Vdcmin, the inverter module 13 is stopped so as to preserve the transistors T1 and T2. The electric load 2 no longer receives current. As during an overvoltage, it is then necessary to recharge the bus capacitor Cb by proceeding as for the startup. When the bus capacitor Cb is fully charged, the transistor T2 is commanded to close. The inverter module 13 can be restarted after a defined period for example with the aid of a command of the restart on-the-fly type. The two transistors T1 and T2 are in the on state and the charge current can pass through the transistor T2 until the transistor T1 has cooled down.

Furthermore, if the voltage V at the terminals of the transistors T1 and T2 stays at a value higher than the first threshold value S1 while the voltage Vdc remains higher than the threshold value Vdcmin, for longer than a defined period t, for example equal to three seconds, that means that the overvoltage has ended and that the charge current remains slightly below the limitation current of the transistor T1. The transistor T1 is then commanded to open so that the voltage Vdc is cancelled out. After a defined period necessary for the transistor T1 to cool, the bus capacitor Cb is recharged by proceeding as for the startup. Then, the inverter module 13 is for example restarted after a defined period, for example with the aid of a command of the restart on-the-fly type.

The device 14 of the invention is of particular value in controllers furnished with a bus capacitor Cb of low capacitance. The device consists in using the transistor T2 to reduce the effect of the non-volatile resistance of the transistor T1 and therefore allow the transistor T1 the time to cool down.

The above description of the various control sequences is based on a protective device furnished with normally on transistors T1, T2. However, it must be understood to be identical to the use of transistors T1, T2 that are of the normally off type. However, in this case, a specific isolated supply is necessary in the control means in order to control the transistors T1 and T2.

The solution of the invention however has the disadvantage of creating a large current variation (high di/dt) at the rectifier module 12 during the overvoltage.

To dissipate the energy generated, it is possible to add, in parallel with the decoupling capacitor Cd, a varistor of the GMov type M1 (shown in dashed lines) or a normally off JFET transistor T3 furnished in parallel with a Zener diode Z1. The transistor T3 will for example be commanded to close by using its avalanche feature or with the aid of a specific command.

The invention claimed is:

1. A speed controller comprising:
   a rectifier module, at an input, in order to generate, on a power bus, a direct voltage from an alternating voltage available on an electrical supply network,
   a bus capacitor connected between a positive line and a negative line of the power bus, and
   an inverter module supplied by the power bus and controlled to deliver an alternating voltage to an electric load,
   the speed controller including a device for protecting the speed controller against overcurrents associated with voltage variations on the electrical supply network, the device including
      a first electronic switch of a JFET transistor type made in a wide forbidden band material and placed on the power bus in series between the rectifier module and the bus capacitor,
      a second electronic switch mounted on the power bus, in parallel with the JFET transistor, and
      means for controlling both the JFET transistor and the second electronic switch, the means for controlling configured to close the second electronic switch in order to remove a thermal memory of the JFET transistor after a strong inrush current occurs through the JFET transistor when the bus capacitor is fully charged and a voltage measured at terminals of the JFET transistor goes below a threshold value.

2. The speed controller according to claim 1, wherein the protective device is mounted on the positive line of the power bus.

3. The speed controller according to claim 1 or 2, wherein the first electronic switch is made of silicon carbide.

4. The speed controller according to claim 3, wherein the JFET transistor is of a normally-closed type.

5. The speed controller according to claim 1, wherein the second electronic switch is a transistor of the JFET type.

6. The speed controller according to claim 5, wherein the second electronic switch is made of silicon carbide.

7. The speed controller according to claim 5, wherein the second electronic switch is of a normally-closed type.

8. The speed controller according to claim 1, wherein the means for controlling the first electronic switch and the second electronic switch are connected between the positive line and the negative line of the power bus.

9. The speed controller according to claim 8, wherein the control means include charge pump circuits configured to apply control voltages to the first and second electronic switches.

10. The speed controller according to claim 1, wherein the control means include storage means storing the threshold value for the voltage measured at the terminals of the JFET transistor, above which the second electronic switch is commanded to open by the control means.

11. The speed controller according to claim 1, wherein the control means include storage means storing a threshold value for the voltage measured between the positive line and the negative line of the power bus, above which the second electronic switch is commanded to open.

12. The speed controller according to claim 1, further comprising:
   a device for protecting the rectifier module against overvoltages.

13. The speed controller according to claim 12, wherein the device for protecting the rectifier module against overvoltages includes a limiting transistor of a normally-closed JFET type and a Zener diode, both connected in parallel between the positive line and the negative line of the power bus.

14. The speed controller according to claim 12, wherein the device for protecting the rectifier module against overvoltages includes a varistor of a GMOV type connected between the positive line and the negative line of the power bus.

15. The speed controller according to claim 1, further comprising:
   a decoupling capacitor connected between the positive line and the negative line of the power bus, downstream of the rectifier module and upstream of the device for protecting the speed controller against overcurrents.

16. The speed controller according to claim 1, wherein the JFET transistor and the second electronic switch are of a normally-open type, and the control means is an external power supply not supplied directly from the power bus.

17. The speed controller according to claim 1, wherein the bus capacitor has a capacitance of the order of 2 µF/kW.

18. A speed controller comprising:
   a rectifier module, at an input, in order to generate, on a power bus, a direct voltage from an alternating voltage available on an electrical supply network,
   a bus capacitor connected between a positive line and a negative line of the power bus, and
   an inverter module supplied by the power bus and controlled to deliver an alternating voltage to an electric load, the speed controller including a device for protecting the speed controller against overcurrents associated with voltage variations on the electrical supply network, the device including a first electronic switch of a normally-closed JFET transistor type made in a wide forbidden band material and placed on the power bus in series between the rectifier module and the bus capacitor, a second electronic switch mounted on the power bus, in parallel with the JFET transistor, and means for controlling both the JFET transistor and the second electronic switch.

* * * * *